(12) United States Patent
Mao et al.

(10) Patent No.: US 6,735,960 B2
(45) Date of Patent: May 18, 2004

(54) COMPOSITION AND METHOD FOR HYDROGEN STORAGE

(75) Inventors: Wendy L. Mao, Washington, DC (US); Ho-Kwang Mao, Washington, DC (US)

(73) Assignee: Carnegie Institution of Washington, Washington, DC (US)

(*) Notice: Subject to any disclaimer, the term of this patent is extended or adjusted under 35 U.S.C. 154(b) by 0 days.

(21) Appl. No.: 10/279,034

(22) Filed: Oct. 24, 2002

(65) Prior Publication Data

US 2003/0089117 A1 May 15, 2003

Related U.S. Application Data

(60) Provisional application No. 60/330,749, filed on Oct. 30, 2001, and provisional application No. 60/413,557, filed on Sep. 26, 2002.

(51) Int. Cl.[7] .............................................. F17C 11/00
(52) U.S. Cl. ............................................................ 62/46.1
(58) Field of Search ................................ 62/45.1, 46.1, 62/54.1

(56) References Cited

U.S. PATENT DOCUMENTS

| | | | |
|---|---|---|---|
| 4,339,252 A | | 7/1982 | Bell et al. ........................ 62/35 |
| 4,386,950 A | | 6/1983 | Bell et al. ........................ 62/10 |
| 5,434,330 A | * | 7/1995 | Hnatow et al. .............. 585/864 |
| 6,245,955 B1 | * | 6/2001 | Smith ............................ 585/15 |

OTHER PUBLICATIONS

Willem L. Vos et al., "Novel $H_2$–$H_2O$ Clathrates at High Pressures", Physical Review Letters, vol. 71, No. 19, pp. 3150–3153, Nov. 8, 1993.

* cited by examiner

Primary Examiner—Henry Bennett
Assistant Examiner—Malik N. Drake
(74) Attorney, Agent, or Firm—Morgan, Lewis & Bockius LLP (57) ABSTRACT

A method for hydrogen storage includes providing water and hydrogen gas to a containment volume, reducing the temperature of the water and hydrogen gas to form a hydrogen clathrate at a first cryogenic temperature and a first pressure and maintaining the hydrogen clathrate at second cryogenic temperature within a temperature range of up to 250 K to effect hydrogen storage. The low-pressure hydrogen hydrate includes $H_2O$ molecules, $H_2$ molecules and a unit cell including polyhedron cages of hydrogen-bonded frameworks of the $H_2O$ molecules built around the $H_2$ molecules.

26 Claims, 10 Drawing Sheets

COMPOSITION AND METHOD FOR HYDROGEN STORAGE

The present invention claims the benefit of a Provisional Application No. 60/330,749 filed on Oct. 30, 2001, and Provisional Application No. 60/413,557 filed on Sep. 26, 2002, which are hereby incorporated by reference in their entirety.

STATEMENT OF GOVERNMENT INTEREST

This invention was made with Government support under Grant No. EAR-8920239, awarded by the National Science Foundation, and Grant No. NAG5-6891, awarded by NASA. The Government has certain rights in this invention.

BACKGROUND OF THE INVENTION

1. Field of the Invention

The present invention relates to hydrogen storage and, more particularly, to a composition and method for hydrogen storage.

2. Description of Related Art

Hydrogen has long been regarded as a promising source of fuel, both as a replacement for conventional hydrocarbon fuels and as a fuel for alternative energy technologies, such as fuel cells. The lightest element, hydrogen has a very high energy-to-weight ratio, and can be combusted cleanly, without carbon monoxide or dioxide byproducts. Unfortunately, storing and transporting useable quantities of hydrogen present difficult problems that are significant barriers to the commercial use of hydrogen as a fuel.

A common technique for storing large quantities of hydrogen is a liquefaction process by compressing and cooling hydrogen from a gas phase into a liquid phase. At ambient pressure, hydrogen gas liquefies at 20 K (i.e., −253 C), and approximately 70 g/L of the hydrogen gas can be stored in the liquid phase. However, the liquefaction process is very energy intensive. For example, the energy used to compress hydrogen gas into a liquid may be as much as 40% of the energy that is within the gas itself. In other words, an additional amount of energy equivalent to about 40% of the energy capable of being expended from the hydrogen gas is needed to liquefy the hydrogen. Further, liquid hydrogen should be maintained at 20 K to prevent the liquefied hydrogen gas from boiling off and causing problems due to the increased gas pressure. Maintaining the liquid hydrogen at 20 K requires specially designed insulated containers and very careful handling.

Another common technique for storing hydrogen is to compress the gas into a suitable vessel. For example, a gas tank pressurized to 35 MPa can store 15 g/L of hydrogen. However, a pressurized-gas tank is heavy and cumbersome. In addition, the circumstances for the transport and use should be carefully controlled to address all of the safety issues for a highly-compressed volatile gas.

Other techniques for hydrogen storage involve chemically bonding hydrogen molecules to a host material. This type of hydrogen storage is being actively investigated, and various materials have been shown to be suitable storage hosts for hydrogen. For example, metals and carbon nanotubes have both been reported as suitable host materials. However, there are still many remaining technical problems, such as the high temperatures required for releasing hydrogen from a metal hydride, to be overcome before the realization of commercial realization of hydrogen storage.

Gas hydrates are solid compounds with "guest" gas molecules trapped in $H_2O$ frameworks that are formed at low temperature while at either a high or ambient pressure. In one set of gas hydrates, water molecules form hydrogen-bonded "cages" around "guest" gas molecules to form a clathrate in which the cage structures are either sI, sII or sH type. In other gas hydrates, the "guest" gas molecules fill in the structural cavities of specific phases of ice, and are commonly called "filled ice". Two types of gas hydrates, denoted as C1 and C2, have been reported at high pressures as discussed in Vos et al., "Novel $H_2$—$H_2O$ Clathrates at High Pressures," Physical Review Letters, 71, pp. 3150–3153, 1993, the disclosure of which is hereby incorporated by reference herein in its entirety. Although the C1 and C2 types of gas hydrates store significant amounts of hydrogen, such as approximately 23 g/L for C1 and approximately 110 g/L for C2, the extremely high pressures, such as greater than 700 MPa for C1 and greater than 2250 MPa for C2, required to form and store the compounds makes them commercially unsuitable, as well as a safety risk.

One of the present inventors is a co-author of the Vos et al. article, in which C1 and C2 are described as "novel clathrates" because, for example, they do not have the classical sI, sII or sH clathrate cage structure. Although this article refers to C1 and C2 as "clathrates," it has since been confirmed that C1 and C2 are not in fact classical "clathrates" under at least some commonly-used definitions. Thus, to avoid any confusion, and for purposes of this application, the term "clathrate" as used herein shall be as defined below in the detailed description of the preferred embodiments.

The hydrogen storage mechanism remains a key challenge for practical usage of hydrogen as a general fuel.

SUMMARY OF THE INVENTION

Accordingly, the present invention is directed to a composition and method for hydrogen storage that substantially obviates on or more of the problems due to limitations and disadvantages of the related art.

An object of the present invention is to provide a composition and method for hydrogen storage at or near-ambient pressure and at a moderate cryogenic temperature.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

An exemplary embodiment of a method for hydrogen storage in accordance with the present invention includes providing water and hydrogen gas to a containment volume, reducing the temperature of the water and hydrogen gas to form a hydrogen clathrate at a first cryogenic temperature and a first pressure, and maintaining the hydrogen clathrate at second cryogenic temperature within a temperature range of up to 250 K to effect hydrogen storage.

In another exemplary embodiment, a method for hydrogen storage includes providing a containment volume having a specified volume, partially filling the containment volume with water, providing hydrogen gas to the specified volume, cooling the containment to a first cryogenic temperature in a cryogenic temperature range of up to 250 K to form a hydrogen hydrate and maintaining the hydrogen hydrate within pressure range of 35 MPa to 0.01 MPa to effect hydrogen storage.

In another exemplary embodiment, a method for hydrogen storage includes providing a containment volume having a specified volume, partially filling the containment volume with water, providing hydrogen gas to the containment volume, pressurizing the containment volume to a first pressure within a pressure range of 100–600 MPa, cooling the containment volume to a first cryogenic temperature within a moderate cryogenic temperature range of 77 K to 250 K to form a hydrogen hydrate, quenching the first pressure in the containment volume to a quenched pressure within a pressure range of 35 MPa to 0.01 MPa and maintaining the hydrogen hydrate within the moderate cryogenic temperature range to effect hydrogen storage.

In another exemplary embodiment, a low-pressure hydrogen clathrate includes $H_2O$ molecules, $H_2$ molecules and a unit cell including polyhedron cages of hydrogen-bonded frameworks of the $H_2O$ molecules built around the $H_2$ molecules.

It is to be understood that both the foregoing general description and the following detailed description are exemplary and intended to provide further explanation of the invention as claimed.

BRIEF DESCRIPTION OF THE DRAWINGS

The accompanying drawings, which are included to provide further understanding of the invention and are incorporated in and constitute a part of the specification, illustrate embodiments of the invention and together with the description serve to explain the principles of the invention. These and other objects of the invention will be apparent from the following detailed description of the embodiments of the present invention with reference to the following drawings.

DETAILED DESCRIPTION OF THE PREFERRED EMBODIMENTS

Figure 1A:
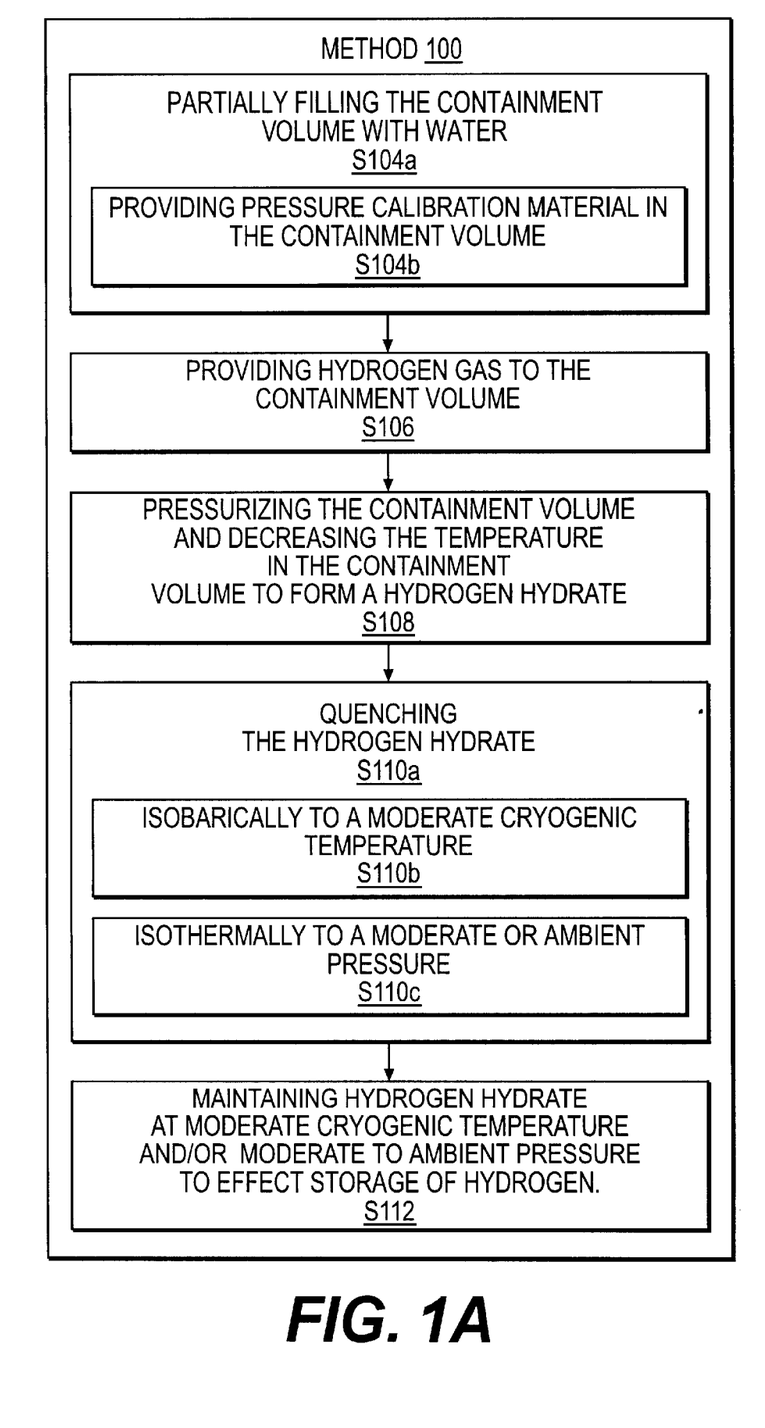
FIG. 1A is a high-level flow diagram of a method according to the present invention for producing a hydrogen hydrate at a relatively high pressure and low temperature.

In a hydrogen storage method according to the present invention, a hydrogen hydrate, such as a hydrogen clathrate, is formed that can store large amounts of hydrogen. For example, the hydrogen clathrate in exemplary embodiments of the invention can store approximately 50 g/L at moderate cryogenic temperatures of approximately 77 K–250 K and at moderate to ambient pressures of 35 MPa to 10 kPa. FIG. 1A is a high-level flow diagram of a hydrogen storage method 100 for forming a hydrogen hydrate in accordance with embodiments of the present invention.

Method 100 can be performed in a well-known Mao-Bell cell, or in any other suitable compression apparatus, such as a gas tank. A Mao-Bell cell is designed to produce very high pressures, such as hundreds of GPa, while allowing observation of the properties of a compound within the cell using appropriate analytical methods. Neither the extremely high pressures nor the analytical opportunities provided by the Mao-Bell cell are required for the present invention, but the use of a Mao-Bell cell can still be advantageous. For example, a user could perform method 100 in a Mao-Bell cell to verify the method parameters and the hydrogen content of a resulting hydrogen hydrate before expanding the method to a production scale using more conventional compression apparatuses, such as a gas tank with a compressor capable of producing pressures up to 200 MPa.

Suitable Mao-Bell cells are disclosed in U.S. Pat. Nos. 4,339,252 and 4,386,950, the disclosures of which are hereby incorporated by reference herein in their entireties. In general, a Mao-Bell cell uses a structure including two diamond anvils with a metal gasket therebetween to produce high pressures. The hydrogen hydrate is formed between the two diamond anvils. The hydrogen hydrate of the present invention can exist at relatively low pressures. Thus, an embodiment of the method 100 using a Mao-Bell cell can include retracting springs, which are adapted to the Mao-Bell cell such that the springs oppose the load application of the diamond anvils. The retracting springs can assist in complete and smooth pressure reduction in withdrawing at least one of the diamond anvils from the metal gasket.

Prior to beginning method 100, the user can pre-indent or drill the metal gasket used in the Mao-Bell cell. For example, a 0.25 mm thick metal gasket is drilled to have a center-hole of about 0.25 to 0.4 mm in diameter. Subsequently, this drilled 0.25 mm thick metal gasket can be used between a pair of 0.7 mm diameter culets on the respective diamond anvils used in the Mao-Bell cell. These dimensions can be scaled appropriately, depending on the volume of the hydrogen hydrate that is to be produced. The metal gasket does not necessarily have to be pre-indented or drilled. For example, the metal gasket can be preformed or manufactured specifically for the task of forming a hydrogen hydrate of a given size. Metals, such as T301 stainless steel and BeCu, are particularly suitable in metal gaskets for use in the methods according to the present invention, although other similar metals may be used in the gasket.

As referred to in step S104a of FIG. 1A, a containment volume is partially filled with water. For example, a standard gas tank can be filled with an amount of water in a range of 20–70% of the volume of the gas tank. The water can be distilled water, de-ionized (DI) water, or any other type of relatively pure water that does not have impurities which can negatively affect subsequent processing or prevent formation of a hydrate.

Alternatively, as referred to in step S104b of FIG. 1A, the step of partially filling the containment volume with water can include providing a pressure calibration material, such as ruby grains, to the containment volume in addition to the water. The pressure calibration material does not react with either the water or a hydrogen gas, which is subsequently introduced into the containment volume. The inclusion of a pressure calibration material allows independent verification of the pressure in the containment volume by external instrumental methods, such as fluorescence spectroscopy through a window of a diamond anvil. The pressure calibration material can also be used in more conventional compression apparatus, such as a gas tank, if a window exists such that spectroscopy or other analytical methods can be performed.

As referred to in step S106 of FIG. 1A, a hydrogen gas is provided to the containment volume in addition to the water. If a Mao-Bell cell is used for the containment volume, the Mao-Bell cell is positioned in a pressure vessel prior to filling the containment volume within the Mao-Bell cell. In both the case of the Mao-Bell cell and the standard gas tank, the hydrogen gas is provided into the remaining volume of the containment volume at a pressure, for example, of 200 MPa. Although the method 100 is described with the water being added first to the containment volume, an alternative is that the water can be added after the hydrogen gas is provided. However, if the water is provided after the hydrogen gas is provided to the containment volume, the water will have to be provided to the containment volume under a higher pressure than the pressure under which the hydrogen gas was provided.

After water and hydrogen gas are provided to the containment volume, the pressure in the containment volume is increased and the temperature of the containment volume is decreased, as referred to in step S108 of FIG. 1A to form a hydrogen hydrate such as a hydrogen clathrate in which cages formed by the water molecules contain the hydrogen. In the case of a gas tank, the pressure can be increased by pumping an increased amount of hydrogen into the gas tank. In the case of a Mao-Bell cell, the upper and lower anvils together with the metal gasket are used to compress the containment volume within the cell. In both cases, liquid nitrogen can be used for cooling by either immersion into liquid nitrogen or heat exchangers using a flow of liquid nitrogen. As the pressure on the hydrogen gas and water increases and the temperature decreases, the hydrogen clathrate is formed. A clathrate, also known as a clathrate hydrate, is a class of solids in which the guest molecules occupy, fully or partially, cages in the host structure made of hydrogen bonded water molecules. Examples of clathrates include the archetypal sI, sII, or sH clathrate crystal structures. Typically, a clathrate includes at least two different cage structures. Depending on the pressure and temperature conditions during the formation process, some residual water and/or hydrogen may be residual in the containment volume. After the hydrogen hydrate has formed, instrumental techniques such as Raman spectroscopy, x-ray diffraction, and fluorescence spectroscopy may be used to verify the phases present if the containment volume contains an appropriate window. The pressure and temperature can be held at designated values, such as 100–600 MPa and 77 K, for a period of several hours to allow the hydrogen hydrate to stabilize, for example, as a hydrogen clathrate.

After any desired "hold" period is complete, the hydrogen hydrate is quenched, as referred to in S110a of FIG. 1A. For example, in the case where the hydrogen hydrate is a hydrogen clathrate, the hydrogen clathrate can be quenched isobarically to a moderate cryogenic temperature in the range of 77 K–250 K, as referred to in S110b of FIG. 1A. The term "moderate cryogenic temperature" is meant to encompass any cryogenic temperature above 77 K that can be maintained by the application of liquid nitrogen or other types of refrigerant liquids.

In addition or in the alternative, the hydrogen hydrate can be quenched isothermally to a moderate pressure or ambient pressure, as referred to in S110c of FIG. 1A. For example, pressures from about 35 MPa to an ambient pressure of about 0.01 MPa are moderate pressures. Although method 100 lists isobarically quenching the hydrogen hydrate to a moderate cryogenic temperature and then isothermally quenching the hydrogen hydrate to a moderate pressure, the hydrogen hydrate can first be isothermally quenched to a moderate pressure and then isobarically quenched to a moderate cryogenic temperature.

Figure 1B:
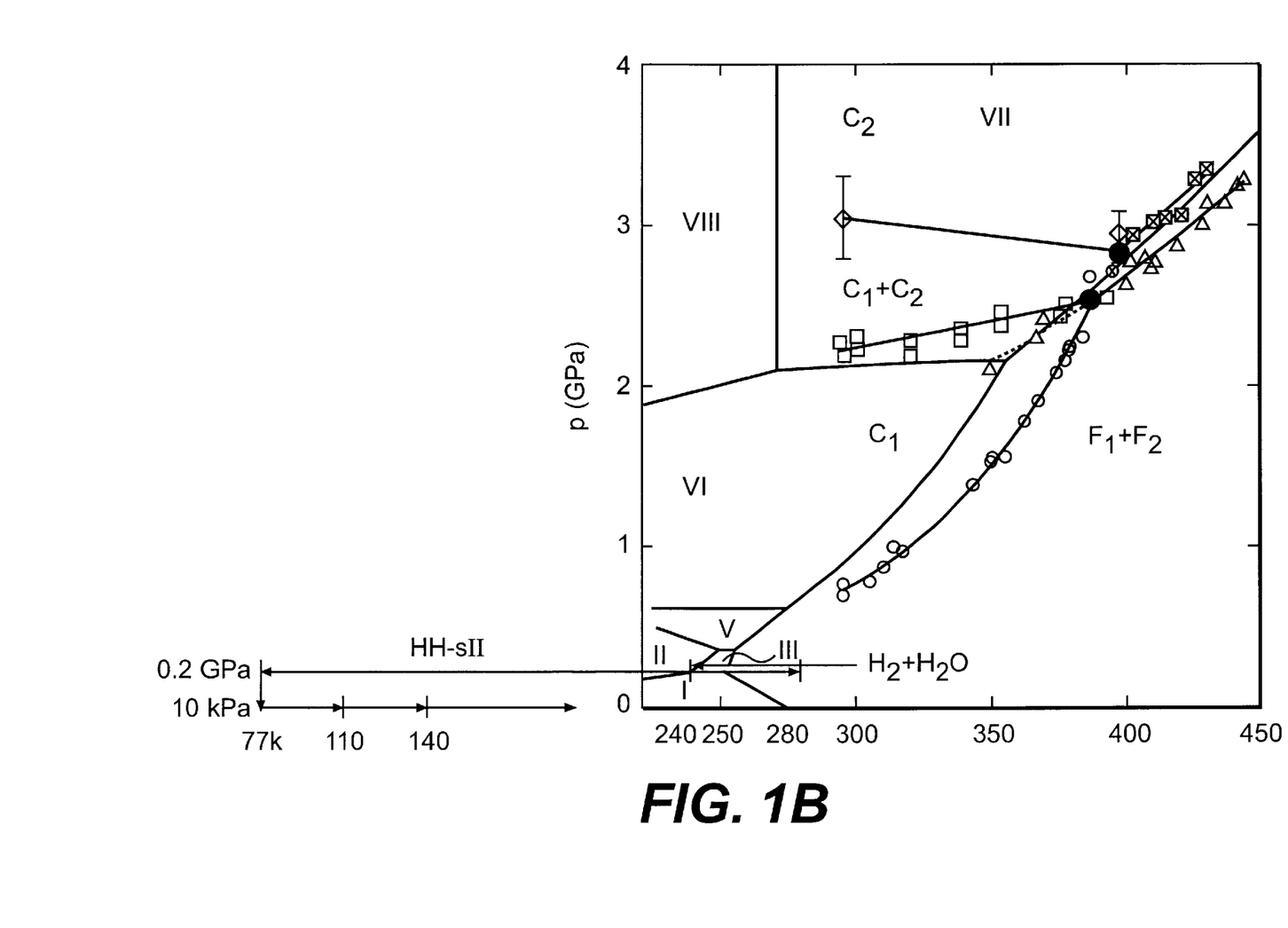
FIG. 1B illustrates a process for forming a hydrogen hydrate in accordance with the method of FIG. 1A shown in relation to an ice phase diagram.

As referred to in step S112 of FIG. 1A, the hydrogen hydrate is maintained at the moderate cryogenic temperature and/or moderate to ambient pressure for as long as desired to effect storage of hydrogen. Because the hydrogen hydrate, such as a hydrogen clathrate, is stable at moderate cryogenic temperature and ambient pressure, the hydrogen hydrate can be utilized as a source of fuel, for example, in an automotive fuel cell. The stored hydrogen gas is released by warming the hydrogen hydrate to a temperature higher than about 140 K at which temperature the hydrogen hydrate will decompose and release hydrogen. Alternatively, a controlled release can be effected by a process of gradual warming between 100 and 150 K that causes hydrogen gas to be released at a constant rate. For example, FIG. 1B illustrates the hydrogen storage process, which uses an sII clathrate, in relation to an ice diagram. Of course, the hydrogen can be stored up to higher temperatures at higher pressures. For example, a hydrogen hydrate in accordance with the present invention can store hydrogen up to 25 K at a pressure of 35 MPa.

As was noted above, method 100 may be performed in any compression apparatus that can compress gas and liquids to a pressure of up to 200 MPa. For example, the hydrogen hydrate can be formed in a standard metal tank, a standard pressure vessel or any other type of tank that can be used for gas storage, with compression performed by either a gas or liquid compressor. For example, suitable compression apparatus includes compressors such as the Remote Diaphragm Compressor Head, a compressor capable of producing pressures of 200 MPa (i.e., 30,006 psi), which is sold by Newport Scientific, Inc. of Jessup, Md. and pressure vessels like those sold by High Pressure Equipment Company of Erie, Pa.

Method 100, as described above, involves the formation of a hydrogen hydrate at a relatively high pressure and low temperature. However, it is possible to form and stabilize a hydrogen hydrate at low temperatures, without the use of high pressures, as shown in the method 120 in FIG. 1C. As referred to in step S124a of FIG. 1C, a containment volume is partially filled with water. Alternatively, as referred to in step S124b of FIG. 1C, the step of partially filling the containment volume with water can include providing a pressure calibration material, such as ruby grains, to the containment volume in addition to the water.

Figure 1C:
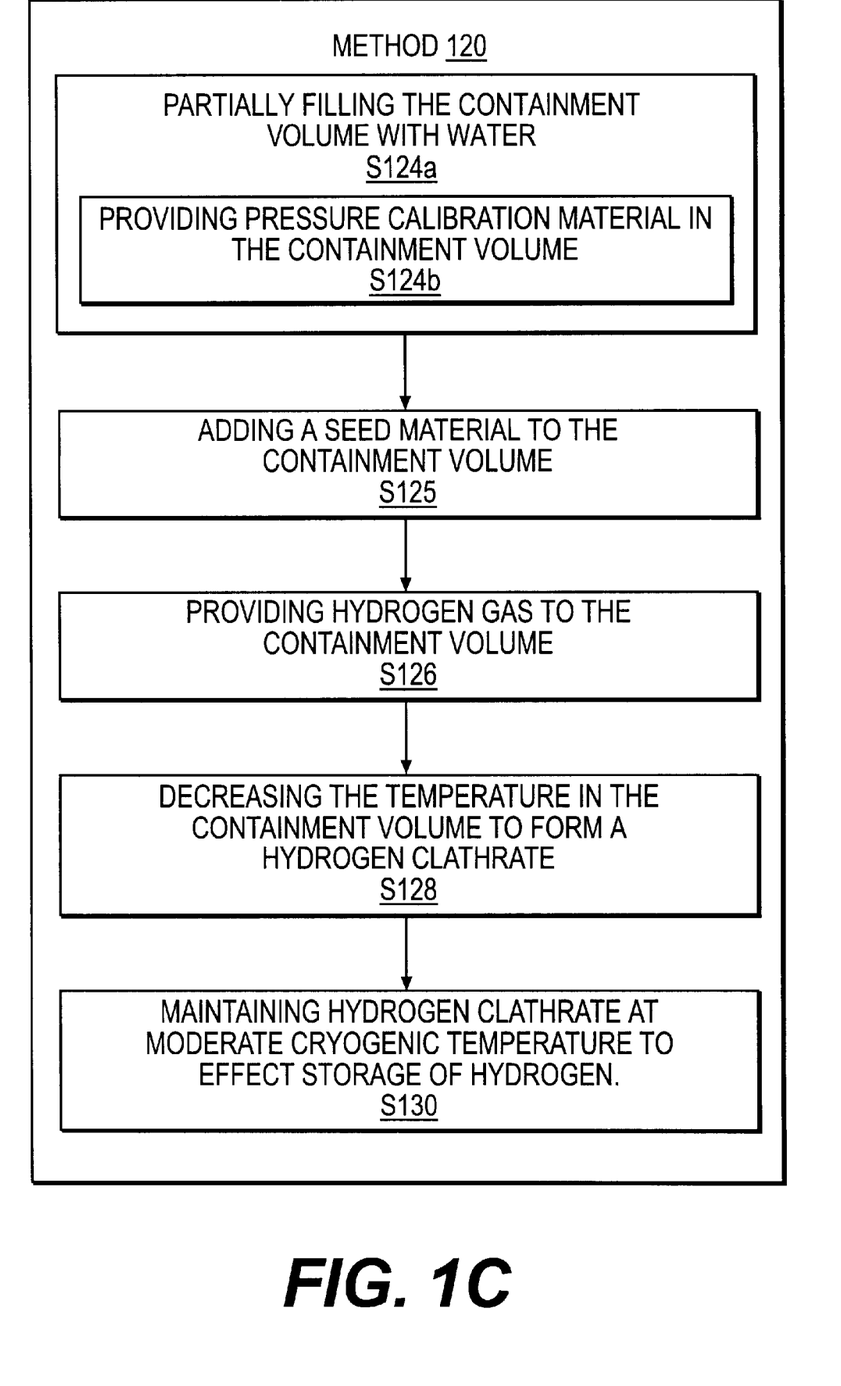
FIG. 1C is a high-level flow diagram of a method according to the present invention for producing a hydrogen hydrate at ambient pressure and low temperature using a seed material.

Initially, the method 120 is similar to method 100. However, method 120 is different in that seed material is added to the containment volume, as referred to in step S125 of FIG. 1C. In the alternative, the seed material can be added to the containment volume after the step of providing hydrogen gas to the containment volume, as referred to in step S126 of FIG. 1C, is performed. For example, a small amount less than 5% by volume of a "seed" material could be added to the hydrogen mix such that the hydrogen hydrate will form at low temperature in a temperature range of 77 K–250 K and near-ambient pressure, such as 10–100 kPa.

Seed materials can include any water-based clathrates, such as a methane hydrate, ethane hydrate or a previously formed hydrogen hydrate that has a clathrate structure. The structure of the seed material should be substantially similar to a clathrate structure such that a clathrate will form when the temperature of the hydrogen mix is reduced. The seed material not only facilitates the formation of a hydrogen hydrate, such as a hydrogen clathrate, but also aids in stabilizing the hydrogen hydrate at moderate cryogenic temperatures.

After the seed material and hydrogen gas are provided, the temperature of the containment volume is decreased to form a hydrogen clathrate, as referred to in step S128 of FIG. 1C. The hydrogen clathrate is maintained at the moderate cryogenic temperature and/or moderate to ambient pressure for as long as desired to effect storage of hydrogen, as referred to in step S130 of FIG. 1C. Because the hydrogen clathrate is formed and stabilized with the seed material, the hydrogen clathrate can be utilized as a source of fuel, for example, in an automotive fuel cell at ambient pressure and a moderate cryogenic temperature.

The method for storing hydrogen according to the present invention will be further described with reference to the following examples.

EXAMPLE I

A hydrogen clathrate was formed in a Mao-Bell cell. Portions of the discussion below refer to FIGS. 2A–2D, which are views through the window of a Mao-Bell cell illustrating the formation of the hydrogen clathrate. The field of view illustrated in FIGS. 2A–2D is approximately 0.4 mm in diameter.

A T301 stainless steel gasket having a thickness of 0.174 mm was prepared by drilling a 0.250 mm hole on center. The T301 stainless steel gasket was installed in the Mao-Bell cell in between the diamond anvils, and the resulting cell was 30% filled with distilled water. Several ruby grains were added for pressure calibration purposes. After adding the water and rubies to the cell, the cell was placed in a gas pressure vessel for filling the remainder of the cell with hydrogen gas at a pressure of 200 MPa.

Figure 2A:
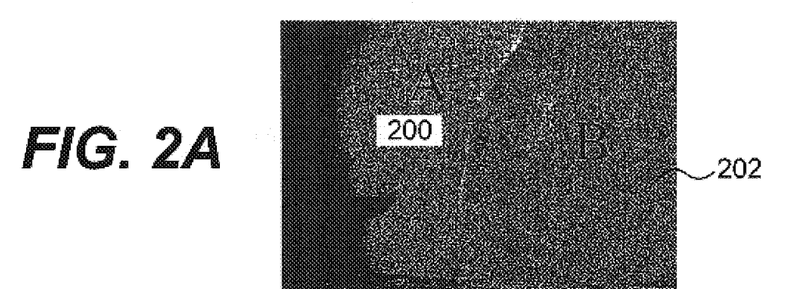
FIGS. 2A–2D are photographs illustrating the formation of a hydrogen hydrate in accordance with exemplary embodiments of the present invention.
Figure 2B:
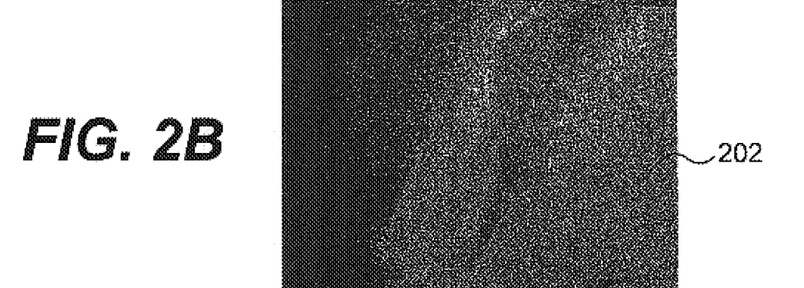
Figure 2C:
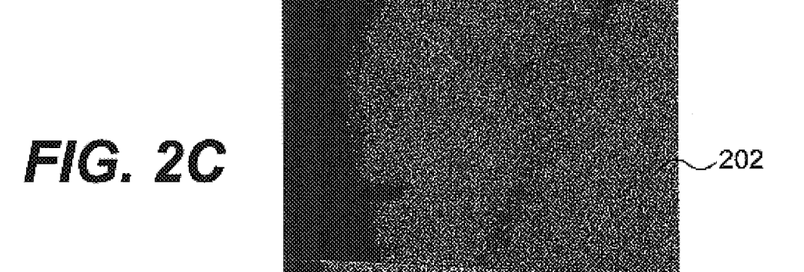
Figure 2D:
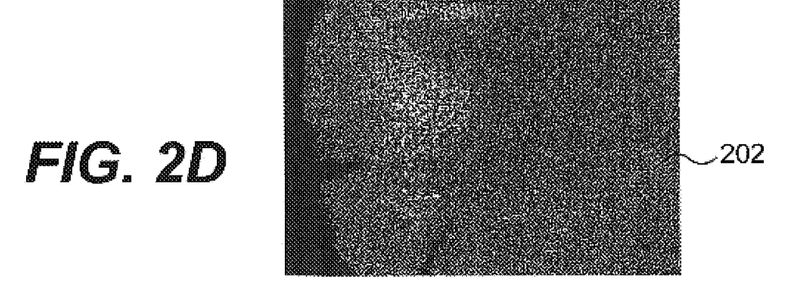

The Mao-Bell cell was then pressurized to a pressure of 300 MPa and cooled isobarically from approximately ambient temperature to 77 K. As shown in FIG. 2A, the pressurized sample initially contained two portions: a liquid water portion 200 and a hydrogen gas portion 202. As shown in FIG. 2B, the water portion 200 first darkened as a result of beginning nucleation into a new phase at 249 K as a hydrogen clathrate within the water 200. Then, as the hydrogen clathrate 204 took over the water portion 200, the water portion 200 cleared, as shown in FIG. 2C. As shown in FIG. 2D, the volume of the portion increased 40%, which indicates the formation of hydrogen clathrate 204 that incorporated hydrogen into the water. Ruby grains trapped in the hydrogen hydrate showed broadened fluorescence peaks, confirming a solid-phase clathrate. Note that the hydrogen gas portion 202, as shown in FIG. 2D, became smaller.

Figure 3:
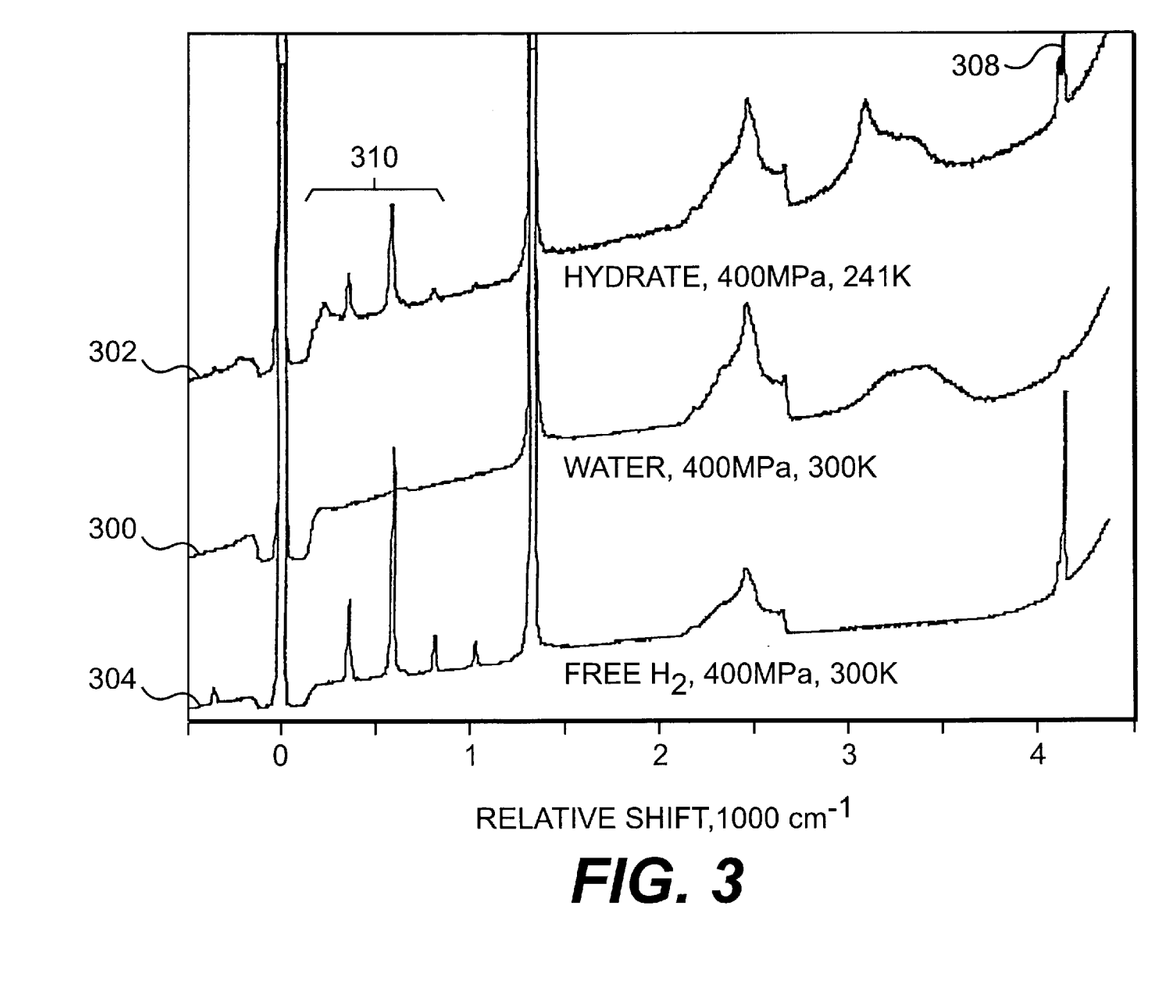
FIG. 3 is a set of comparative exemplary Raman spectra taken after formation of a hydrogen hydrate in accordance with the present invention.

The presence of hydrogen clathrate was confirmed with a series of Raman spectra. FIG. 3 is a set of comparative exemplary Raman spectra taken after formation of the hydrogen clathrate. As is shown in water spectrum 300, the broad Raman peak of the liquid water at 3000–3600 cm$^{-1}$, indicated at 306, is sharpened in the hydrate spectrum 302 and shows four distinct peaks relative to those in the hydrogen gas spectrum 304. Intense hydrogen vibrons 308 and rotons 310 appeared in the Raman spectra of the hydrate 302. The hydrogen:water molar ratio in the hydrogen clathrate was estimated to be about 1:2 from the intensities of the hydrogen Raman peaks relative to those in the hydrogen bubble, which were consistent with a visual observation of 40% volume expansion of the hydrogen clathrate. In other words, approximately 50 g/L of hydrogen can be stored and then later recovered from the hydrogen clathrate. The strong peak at approximately 1332 cm$^{-1}$ in all three spectra 300, 302, 304 is caused by the diamond anvils of the Mao-Bell cell.

The hydrogen clathrate was stabilized at a temperature of 77 K and 300 MPa. After the hydrogen clathrate was stabilized, the pressure was released until atmospheric pressure of about 0.1 MPa was reached. A Raman spectra taken during the reduction in pressure indicated that the hydrogen vibrons and rotons in the hydrate portion remained, indicating successful storage of hydrogen. The hydrogen clathrate disintegrates and releases hydrogen at a temperature of 140 K and ambient pressure.

Figure 4:
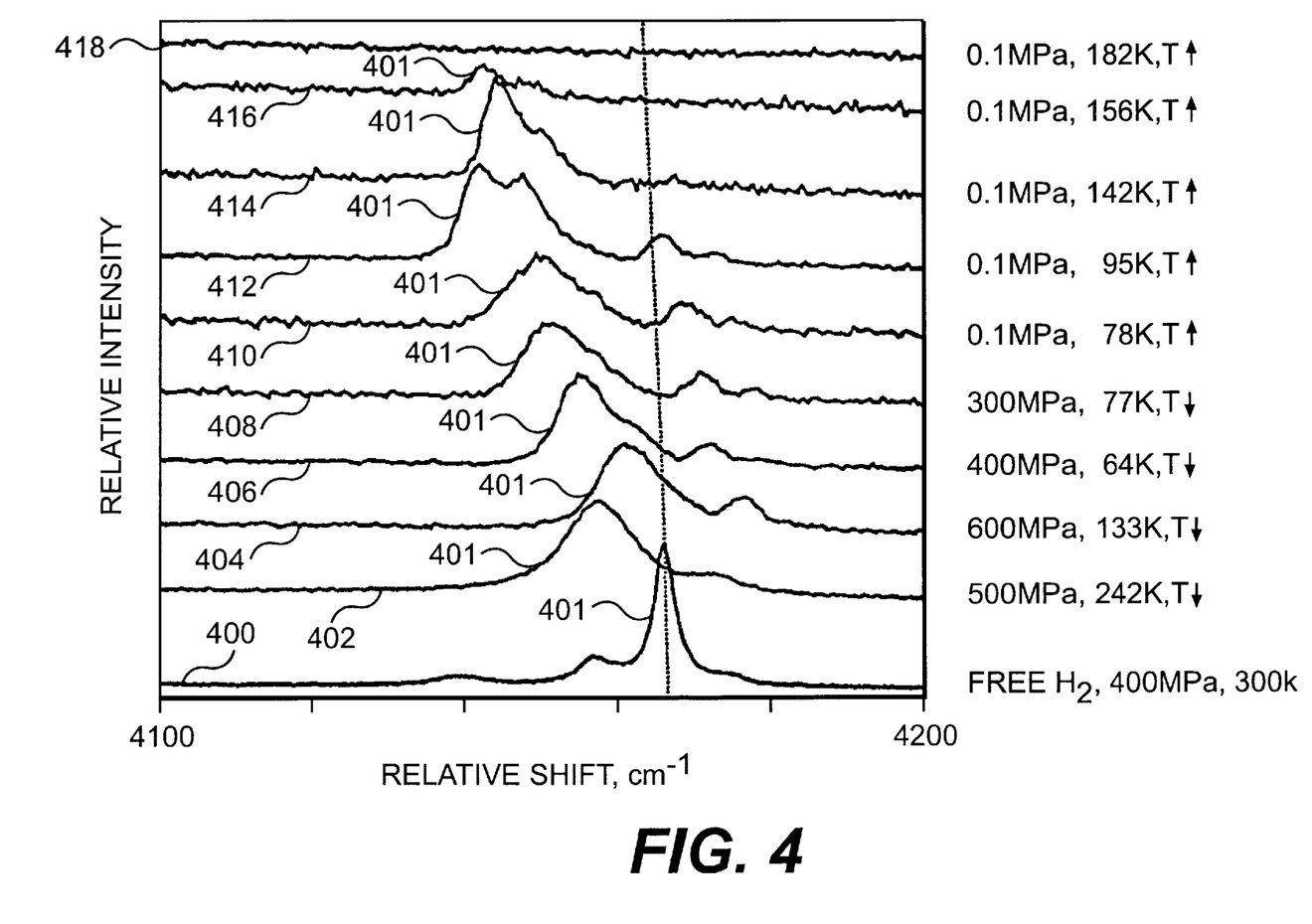
FIG. 4 is a set of enlarged detail views of exemplary Raman spectra of a hydrogen hydrate according to the present invention.

FIG. 4 is a set of enlarged detail views of exemplary Raman spectra of a hydrogen clathrate in accordance with the present invention and a comparative Raman spectrum of hydrogen gas, illustrating the stability of the hydrogen clathrate at various temperatures and pressures. In particular, FIG. 4 illustrates a portion of the hydrogen clathrate between 4000 and 4100 cm$^{-1}$, showing the $Q_1(l)$ molecular hydrogen vibron 401 in the spectrum of the hydrogen clathrate over a range of temperatures and pressures. Spectrum 400 illustrates the $Q_1(l)$ vibron 401 of hydrogen gas at 400 MPa and 300 K. Spectra 402–418 illustrate that same $Q_1(l)$ vibron 401 in the spectrum of the hydrogen clathrate at particular pressures and temperatures. Spectra 414 and 416 demonstrate that the hydrogen clathrate begins to decompose at about 140 K and is almost entirely decomposed at a temperature of 156 K. In general, the successive leftward shift of the $Q_1(l)$ vibron in spectra 402–418 demonstrates the stability of the hydrogen hydrate at ambient pressure and moderate cryogenic temperatures. More specifically, the $Q_1(l)$ vibron 401 of this hydrogen clathrate shifts to lower energy, as the temperature increases at ambient pressure.

EXAMPLE 2

Hydrogen clathrate was prepared in accordance with the procedure of Example 2, except that the Mao-Bell cell was 50% filled with distilled water and 50% with the hydrogen gas. The volumes of water and hydrogen gas remaining after hydrogen clathrate formation confirm the hydrogen:water molar ratio of about 1:2 within the hydrogen clathrate.

EXAMPLE 3

A hydrogen clathrate is prepared in a gas tank manufactured by the High Pressure Equipment Company of Erie, Pa. as a Series R pressure vessel and compression is performed by a Remote Diaphragm Compressor Head from Newport Scientific, Inc. of Jessup, Md. The pressure vessel is 70% filled with water before hydrogen gas is compressed into the pressure vessel to reach a pressure of 200 MPa. The pressure vessel is cooled isobarically from near ambient temperature to 200 K and then held for sufficient time to allow a hydrogen clathrate to form. The hydrogen clathrate is further cooled to 77 K and then the pressure is released isothermally to ambient pressure. The hydrogen clathrate is retrieved from the pressure vessel while maintained at 77 K, and hydrogen gas is subsequently released from the hydrogen clathrate by warming to 140 K.

EXAMPLE 4

A pressure vessel, such as in Example 3, is 30% filled with distilled water and hydrogen gas at ambient temperature and pressure. A 3% by volume methane hydrate is added to promote nucleation of the hydrogen clathrate. The vessel is immersed in a cryostat and cooled to 77 K. The pressure vessel is maintained at 77 K until the hydrogen clathrate is formed. The hydrogen clathrate is retrieved from the pressure vessel while maintained at 77 K, and hydrogen gas is subsequently released from the hydrogen clathrate by warming from about 110 K to 140 K.

In the examples above, polyhedron cages of hydrogen-bonded frameworks of $H_2O$ molecules are built around guest molecules to form solid clathrate hydrates, thus trapping the guest molecules at temperatures and pressures at which the guest molecules would otherwise exist as free gases. Classical clathrates crystallize in three basic forms or cell units designated as sI, sII, and sH that have about one cage, either large or small, for every six water molecules. With each cage singularly occupied by a guest molecule, clathrates at ambient pressure were thought to be limited to guest/$H_2O$ molar ratio of R~⅙, which is also known as Villard's Rule.

The hydrogen clathrate hydrate discussed in the above embodiments of the present invention is a classical sII clathrate hydrate with a $H_2/H_2O$ molar ratio R as high as ~½. This is because the small cages are doubly occupied by clusters of hydrogen molecules and most of the large cages are quadruply occupied by clusters of hydrogen molecules. The hydrogen clathrate is stable or metastable to ambient pressure and low temperature after initial synthesis at a moderate pressure. X-ray and neutron diffraction were employed for structure identification of the hydrogen clathrate as a sII cell unit. In addition, Raman and infrared spectroscopy were employed for probing molecular interactions of the hydrogen clusters and water host within the hydrogen clathrate.

For example, in Mao-Bell cell experiments, a mixture of $H_2$ and $H_2O$ samples was initially compressed to 180–220 MPa at 300 K. The samples were clearly separated into two regions, a $H_2$ bubble and liquid water. Cooling down to 240 K, the two samples were observed to react and form a single, solid compound. These phases were monitored in-situ by optical microscopy and probed individually by Raman, infrared, and energy dispersive x-ray diffraction (EDXD). A neutron diffraction study with a $D_2$—$D_2O$ sample in an aluminum cell was also conducted.

The $H_2:H_2O$ molar ratio R of the compound can be determined by three independent methods. The first method is direct microscopic observation through diamond windows of the Mao-Bell cell to obtain measurements of the volumes of the initial hydrogen bubble and $H_2O$ liquid, the hydrogen clathrate solid below 240 K, as well as the bubble and liquid after reversal reaction by warming to 280 K at 200 MPa. These measurements yield an $H_2:H_2O$ molar ratio R=0.45, with ±0.05 uncertainty. The second method uses the intensities of hydrogen Raman spectra for both roton and vibron that are insensitive to the molecular environment. The Raman intensities yield a $H_2:H_2O$ molar ratio R=0.48 with an uncertainty of ±0.04 for the hydrogen clathrate in accordance with exemplary embodiments of the invention. The third method is to calculate the volume ratio of the empty space to be filled by $D_2$ in relation to the injected liquid $D_2O$ in the 600 $mm^3$ sample chamber of the aluminum cell. Such a calculation yields a $H_2:H_2O$ molar ratio R=0.45 with an uncertainty of ±0.05.

By using energy dispersive x-ray diffraction ("EDXD") at the X17B beamline of National Synchrotron Light Source (NSLS), twenty-one diffraction peaks were observed as shown in Table 1 below.

TABLE 1

| | | | X-ray diffraction at 220 MPa and 234 K $a = 17.047 ± 0.010Å$ | | | Neutron diffraction at 180 MPa and 220 K $a = 17.083 ± 0.018Å$ | | |
|---|---|---|---|---|---|---|---|---|
| h | k | l | $d_{exp}Å$ | $d_{cal}Å$ | $d_{exp}-d_{cal}$ | $d_{exp}Å$ | $d_{cal}Å$ | $d_{exp} - d_{cal}$ |
| 2 | 2 | 0 | 6.0252 | 6.0272 | −0.0020 | 6.0472 | 6.0399 | 0.0072 |
| 3 | 1 | 1 | 5.1379 | 5.1400 | −0.0021 | 5.1533 | 5.1509 | 0.0025 |
| 2 | 2 | 2 | 4.9186 | 4.9212 | −0.0026 | 4.9347 | 4.9316 | 0.0031 |
| 4 | 0 | 0 | 4.2604 | 4.2619 | −0.0015 | 4.2699 | 4.2709 | −0.0010 |
| 3 | 3 | 1 | 3.9068 | 3.9110 | −0.0042 | 3.9165 | 3.9192 | −0.0027 |
| 4 | 2 | 2 | 3.4763 | 3.4798 | −0.0035 | 3.4861 | 3.4872 | −0.0010 |
| 5 | 1 | 1 | 3.2770 | 3.2808 | −0.0038 | 3.2859 | 3.2877 | −0.0019 |
| 4 | 4 | 0 | 3.0098 | 3.0136 | −0.0038 | 3.0207 | 3.0200 | 0.0008 |
| 5 | 3 | 1 | 2.8771 | 2.8816 | −0.0045 | 2.8844 | 2.8876 | −0.0033 |
| 6 | 2 | 0 | BeCu | | | 2.7007 | 2.7011 | −0.0004 |
| 5 | 3 | 3 | 2.5927 | 2.5997 | −0.0070 | 2.6043 | 2.6052 | −0.0009 |
| 5 | 5 | 1 | 2.3913 | 2.3871 | 0.0042 | | | |
| 5 | 5 | 3 | 2.2146 | 2.2194 | −0.0048 | 2.2236 | 2.2241 | −0.0005 |
| 8 | 0 | 0 | 2.1340 | 2.1309 | 0.0031 | | | |
| 6 | 4 | 4 | BeCu | | | 2.0704 | 2.0717 | −0.0013 |
| 6 | 6 | 2 | 1.9619 | 1.9555 | 0.0064 | | | |
| 8 | 4 | 2 | 1.8630 | 1.8600 | 0.0030 | | | |
| 9 | 3 | 1 | BeCu | | | 1.7956 | 1.7908 | 0.0047 |
| 7 | 5 | 5 | 1.7137 | 1.7133 | 0.0004 | 1.7152 | 1.7170 | −0.0018 |
| 11 | 3 | 3 | 1.4479 | 1.4460 | 0.0019 | | | |
| 12 | 2 | 0 | 1.4017 | 1.4013 | 0.0004 | | | |
| 9 | 7 | 5 | 1.3722 | 1.3693 | 0.0029 | | | |
| 8 | 8 | 6 | 1.3324 | 1.3312 | 0.0012 | | | |
| 14 | 2 | 0 | 1.2054 | 1.2054 | 0.0000 | | | |

All-even or all-odd hkl's indicate a face-centered cubic (fcc) unit cell. BeCu denotes sample peaks overlapping with BeCu peaks. The x-ray data are summarized from a series of EDXD patterns at various 2θ angles of 3.6°, 4°, 4.5°, 5°, 6°, 7°, 8°, 9°, 10°, 11°, and 12°. Due to the coarse crystallinity of the sample, peak intensities vary widely and are not included in the table. The maximum EDXD range is 8 Å, because the sapphire window for Raman spectroscopy of the cryostat absorbs x-rays below 20 keV. The peaks can be indexed with an fcc unit cell with a=17.047 (±0.010) Å, which is consistent with the archetypal sII clathrate (space group Fd3m). Preliminary time-of-flight neutron diffraction data collected at the HIPD instrument at Los Alamos Neutron Science Center ("LANSCE") confirm the x-ray results, as shown in Table 1.

Figure 5A:
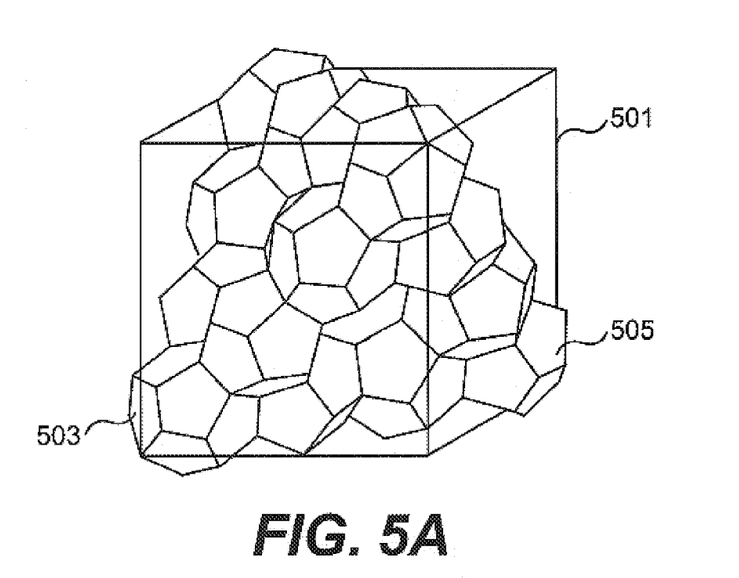
FIG. 5A is the sII crystal clathrate structure having of $5^{12}6^4$ cages and $5^{12}$ cages.
Figure 5B:
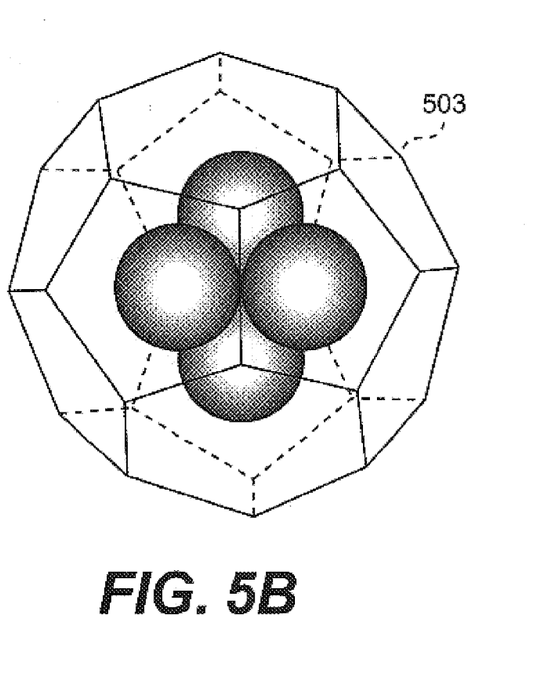
FIG. 5B is a tetrahedral cluster of four hydrogen molecules in the $5^{12}6^4$ cage.
Figure 5C:
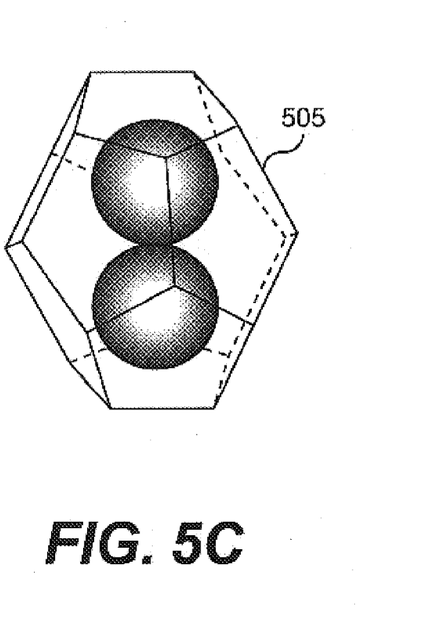
FIG. 5C is a cluster of two hydrogen molecules oriented toward opposite pentagonal faces in the $5^{12}6^4$ cage.

As represented in FIG. 5A, the sII unit cell 501 includes 136$H_2O$ molecules form frameworks of eight hexakaidodecahedron ($5^{12}6^4$) cages 503 and sixteen pentagonal dodecahedron ($5^{12}$) cages 505. For the present sII hydrogen clathrate, at least some of the twenty-four cages must be more than doubly occupied to accommodate the 61±7$H_2$ molecules such that R=0.45±0.05. For stability of the hydrogen clathrate, the size ratio of molecular diameter to the free cavity diameter should be close to but less than 1. For close packed clusters of two, three, four, five, and six $H_2$ molecules, the cluster diameters are 5.44, 5.86, 6.05, 6.57, and 6.57 Å, respectively. These cluster diameters are all smaller than the free cavity diameter of the $5^{12}6^4$ cage, which is 6.67 Å but larger than that of the $5^{12}$ cage, which is 5.02 Å. However, unlike a single large molecule, the hydrogen molecules in the cluster are not bonded to one another, and the $5^{12}$ cage could be considered as two separate cages each having a free cavity diameter of 3.27 Å that could easily accommodate a hydrogen molecule if the cluster axis is orientationally ordered toward opposite pentagonal faces. Thus, four $H_2$ to each $5^{12}6^4$ cage, as shown in FIG. 5B and two $H_2$ to each $5^{12}$ cage, as shown in FIG. 5C, is equivalent to a total of 32 $H_2$ in $5^{12}$ cages and 32 $H_2$ in $5^{12}6^4$ cages per 136 $H_2O$ molecules for $H_2:H_2O$ molar ratio of R=0.47.

Figure 6:
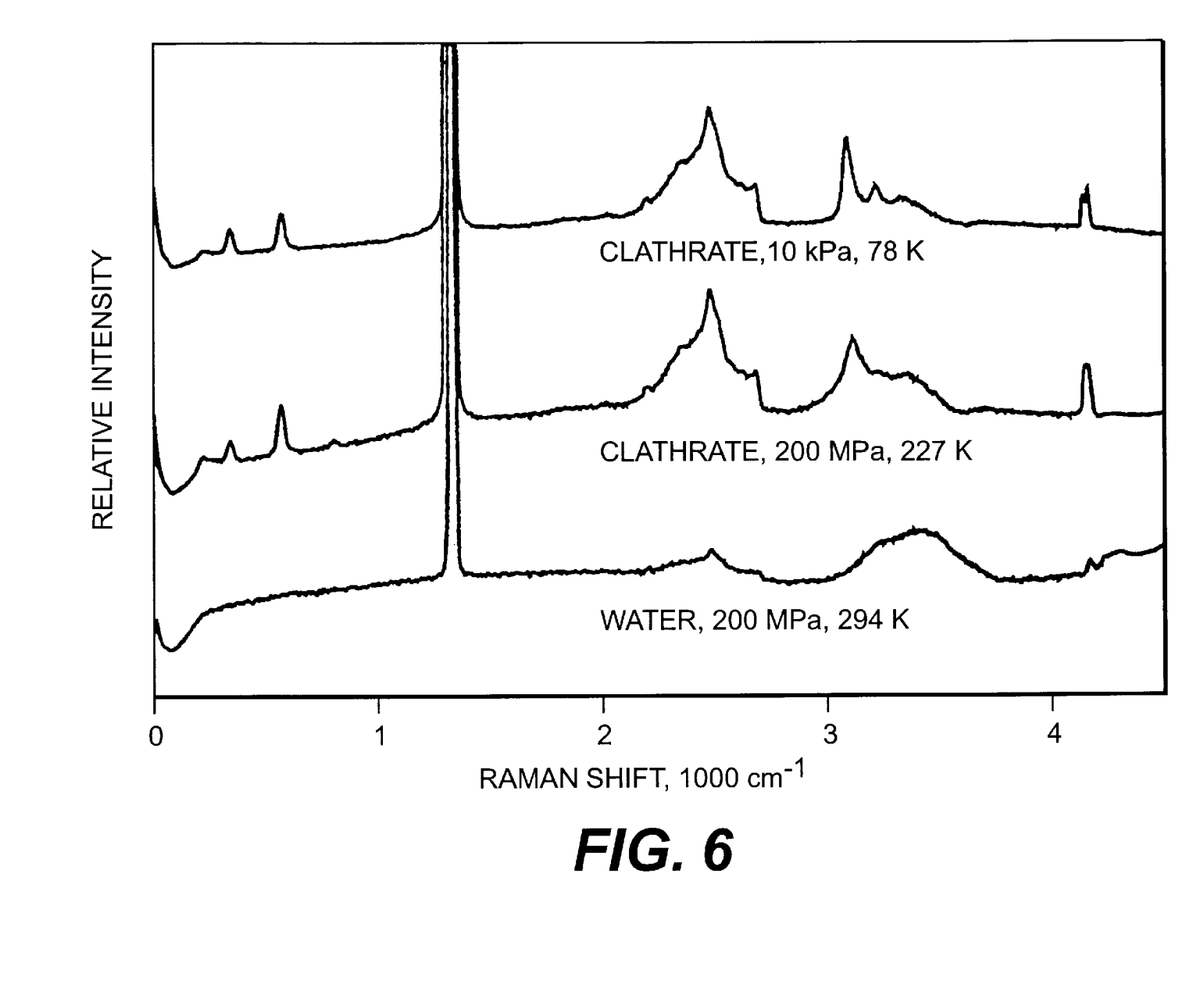
FIG. 6 depicts full-range Raman spectra showing the hydrogen molecular rotons $S_0(0)$, $S_0(1)$, and $S_0(2)$ at ~355 $cm^{-1}$, 390 $cm^{-1}$, and 815 $cm^{-1}$.
Figure 7:
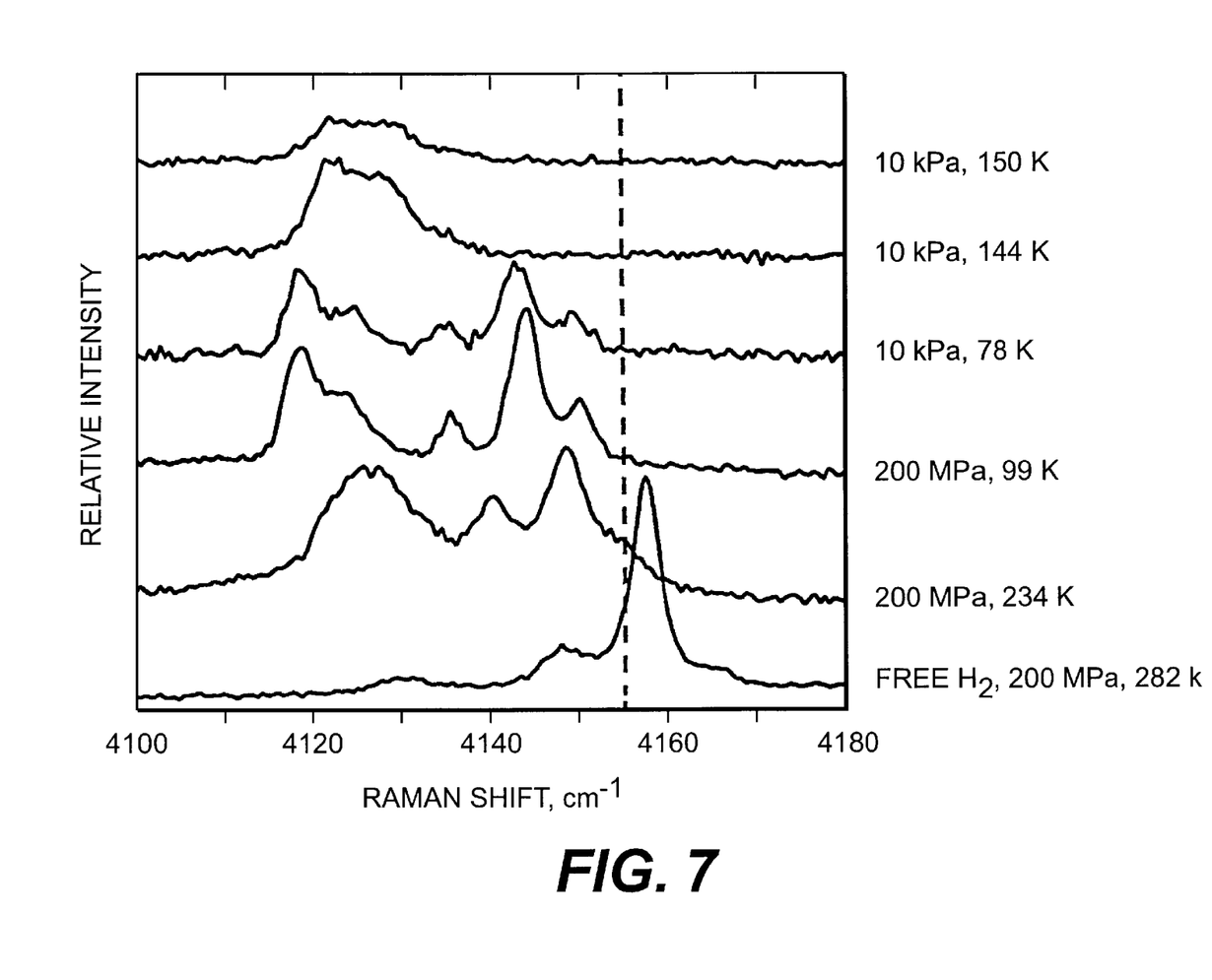
FIG. 7 depicts Raman spectra of the hydrogen hydrate according to the present invention in the region of the molecular hydrogen vibrons.

Raman spectroscopy was used for characterization of the bonding changes. At the formation of the hydrogen clathrate, broad liquid water OH peaks at 3000–3600 cm$^{-1}$ transform to sharp peaks typical of sII clathrates. Meanwhile, hydrogen roton peaks appear at 300–850 cm$^{-1}$, and vibron peaks at 4100–4200 cm$^{-1}$, as shown in FIG. 6. Hydrogen rotons, $S_0(0)$, $S_0(1)$, and $S_0(2)$, in the clathrate are similar in frequency to those of pure hydrogen, indicating that the hydrogen molecules in clathrate cages are still in free rotational states. H—H vibrons of the new clathrate, on the other hand, are distinct from vibrons of other known phases in the $H_2$—$H_2O$ system. Vibrons of the sII hydrogen clathrate, in contrast, appear at 4120–4150 cm$^{-1}$, as shown in FIG. 7, which is significantly below the dominant $Q_1(1)$ vibron at zero pressure, which is 4155 cm$^{-1}$. Once the sII hydrogen clathrate is synthesized, it shows remarkable stability or metastability. For example, the sII hydrogen clathrate persisted at 200 MPa to 280 K. Along another Pressure-Temperature path, a hydrogen clathrate remained after the sII hydrogen clathrate was cooled down to 78 K at 200 MPa and then exposed to a vacuum of approximately 10 kPa in a cryostat. Other Pressure-Temperature paths can be used for other types of hydrates or clathrates.

High-resolution vibron spectra, as shown in FIG. 7, for the hydrogen clathrate display two groups of multiplets of nearly equal intensities that supports the assignment of two equal populations of hydrogen molecules in eight $5^{12}6^4$ and sixteen $5^{12}$ cages. The lower-frequency group at 4115–4135 cm$^{-1}$ is assigned to the loosely fitted tetrahedral molecular cluster in the $5^{12}6^4$ cage and the higher-frequency group at 4135–4155 cm$^{-1}$ is assigned to two molecules ordered in the $5^{12}$ cage. Warming up from 78 K at 10 kPa, the higher-frequency vibrons gradually vanish above 115 K, while the lower-frequency vibrons and the sII crystal structure persist to 145 K, which is consistent with the above peak assignment as the sII structure is known to remain stable with filled $5^{12}6^4$ cages and empty $5^{12}$ cages, such as $SF_6.17H_2O$. Above 145 K at 10 kPa, the lower-frequency vibrons gradually disappear and the crystal structure collapses.

Figure 8:
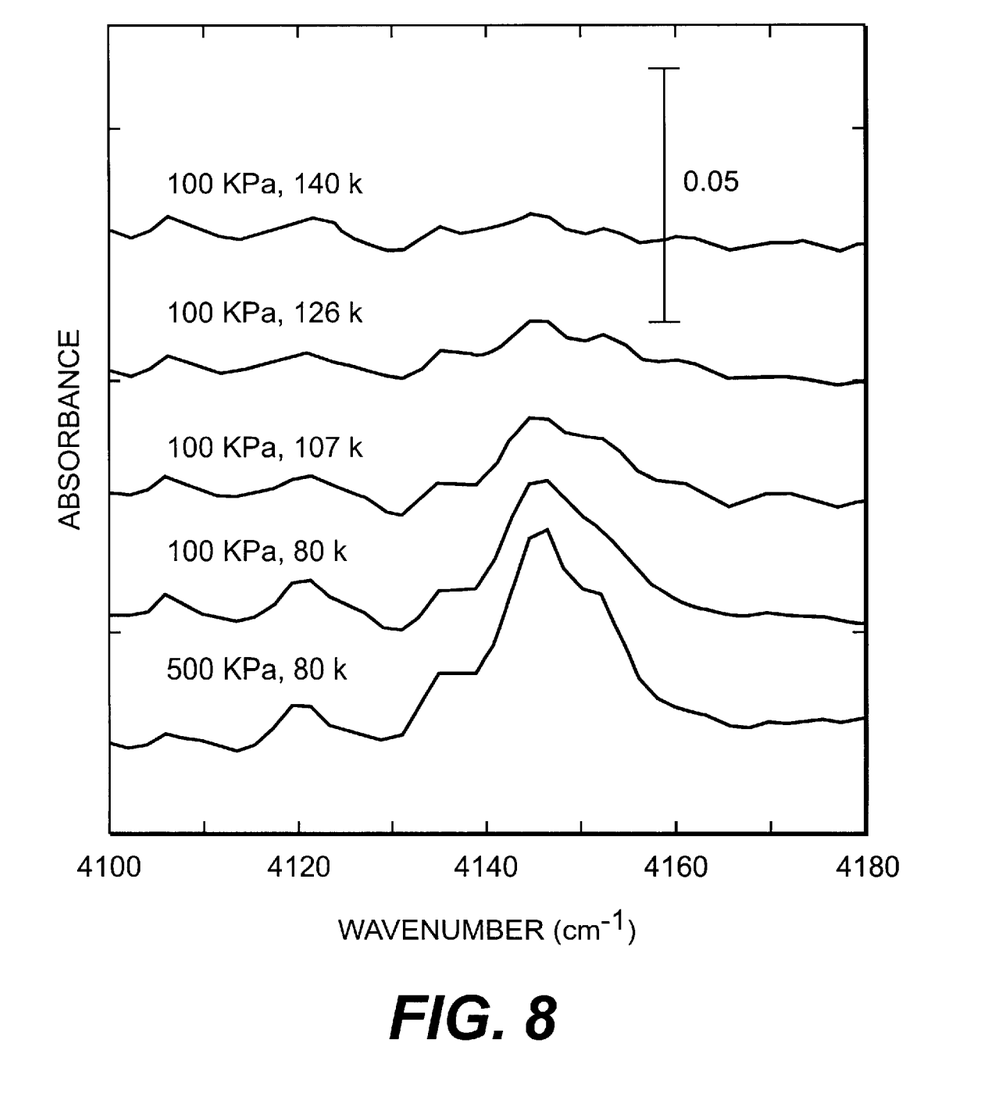
FIG. 8 depicts infrared spectra of the molecular hydrogen in a hydrogen hydrate according to the present invention.

Infrared spectra of the hydrogen clathrate also show a hydrogen vibron peak at 4145 cm$^{-1}$ and a very weak peak at 4125 cm$^{-1}$, as shown in FIG. 8. Unlike the Raman vibron intensity which is intrinsic to the hydrogen molecule, the infrared vibron intensity is highly sensitive to the environment. Being a homonuclear molecule, a free hydrogen molecule does not have an electric dipole and thus does not absorb infrared. Bonded in a solid, the hydrogen electron density is distorted and shows collision induced infrared absorption. The relatively high intensity of the 4145 cm$^{-1}$ peak is consistent with a bimolecular cluster ordered in the $5^{12}$ cages, and the lack of intensity of the 4125 cm$^{-1}$ peak is consistent with a fluid-like cluster in the loosely-fitted $5^{12}6^4$ cages. Upon changing pressure-temperature conditions the infrared vibrons follow similar behavior as the Raman vibrons of the hydrogen clathrate.

While the invention has been described by way of exemplary embodiments, it is understood that the words which have been used herein are words of description, rather than words of limitation. It will be apparent to those skilled in the art that various modifications and variations can be made in the composition and method for hydrogen storage of the present invention without departing from the spirit or scope of the invention. Thus, it is intended that the present invention cover the modifications and variations of this invention provided they come within the scope of the appended claims and their equivalents.

What is claimed is:

1. A method for hydrogen storage, comprising:
    providing water and hydrogen gas to a containment volume;
    reducing the temperature of the water and hydrogen gas to form a hydrogen clathrate at a first cryogenic temperature and a first pressure; and
    maintaining the hydrogen clathrate at second cryogenic temperature within a temperature range of up to 250 K to effect hydrogen storage.
2. The method for hydrogen storage of claim 1, further comprising:
    isobarically quenching the hydrogen clathrate from the first cryogenic temperature to the second cryogenic temperature.
3. The method for hydrogen storage of claim 1, further comprising:
    isothermally quenching the hydrogen clathrate from the first pressure to a quenched pressure within a quench pressure range of 35 MPa to 10 kPa.
4. The method for hydrogen storage of claim 1, wherein the first pressure is between 100–600 MPa and the first cryogenic temperature is between 77 K–250 K.
5. The method for hydrogen storage of claim 1, further comprising:
    adding a seed material to the containment volume.
6. The method for hydrogen storage of claim 5, wherein the seed material is a clathrate, the first pressure is between 10–100 kPa and the first cryogenic temperature is between 77 K–250 K.
7. The method for hydrogen storage of claim 6, wherein the seed material is added in an amount less than or equal to 5% by volume of the mixture of hydrogen and water.
8. A method for hydrogen storage, comprising:
    providing a containment volume having a specified volume;
    partially filling the containment volume with water;
    providing hydrogen gas to the specified volume;
    cooling the containment to a first cryogenic temperature in a cryogenic temperature range of up to 250 K to form a hydrogen hydrate; and
    maintaining the hydrogen hydrate within pressure range of 35 MPa to 0.01 MPa to effect hydrogen storage.
9. The method of claim 8, further comprising:
    pressurizing the containment volume to a first pressure within a pressure range of 100–600 MPa; and
    quenching the first pressure on the hydrogen hydrate to a quenched pressure within a quenched pressure range of 35 MPa to 0.01 MPa.
10. The method of claim 9, wherein pressurizing the containment volume vessel is performed in a pressure vessel using a compressor.
11. The method of claim 8, further comprising:
    quenching the first cryogenic temperature to a quenched temperature within a quenched temperature range of 77 K to 250 K.
12. The method of claim 8, further comprising:
    adding a seed and stabilizer material to the containment volume.
13. The method of claim 12, wherein the seed material is a clathrate.
14. The method for hydrogen storage of claim 12, wherein the seed material is added in an amount less than or equal to 5% of the specified volume.

15. The method for hydrogen storage of claim 8, wherein the step of partially filling the containment volume with water provides water in an amount equal to 20 to 70% of the specified volume.

16. The method of claim 8, wherein the hydrogen hydrate is a clathrate.

17. A method for hydrogen storage, comprising:

providing a containment volume having a specified volume;

partially filling the containment volume with water;

providing hydrogen gas to the containment volume;

pressurizing the containment volume to a first pressure within a pressure range of 100–600 MPa;

cooling the containment volume to a first cryogenic temperature within a moderate cryogenic temperature range of 77 K to 250 K to form a hydrogen hydrate;

quenching the first pressure in the containment volume to a quenched pressure within a pressure range of 35 MPa to 0.01 MPa; and maintaining the hydrogen hydrate within the moderate cryogenic temperature range to effect hydrogen storage.

18. The method of claim 17, wherein calibration material is added to the containment volume during the step of partially filling the containment volume with water.

19. The method of claim 17, wherein pressurizing the containment volume vessel is performed using a compressor.

20. The method of claim 17, wherein said maintaining is performed using liquid nitrogen.

21. A low-pressure hydrogen hydrate, comprising:

$H_2O$ molecules;

$H_2$ molecules; and a unit cell including polyhedron cages of hydrogen-bonded frameworks of the $H_2O$ molecules built around the $H_2$ molecules, wherein there are at least two different cage structures.

22. A low-pressure hydrogen hydrate, comprising:

$H_2O$ molecules;

$H_2$ molecules; and a unit cell including polyhedron cages of hydrogen-bonded frameworks of the $H_2O$ molecules built around the $H_2$ molecules, wherein the unit cell is a sI unit cell.

23. A low-pressure hydrogen hydrate, comprising:

$H_2O$ molecules;

$H_2$ molecules; and a unit cell including polyhedron cages of hydrogen-bonded frameworks of the $H_2O$ molecules built around the $H_2$ molecules, wherein the unit cell is a sH unit cell.

24. A low-pressure hydrogen hydrate, comprising:

$H_2O$ molecules;

$H_2$ molecules; and a unit cell including polyhedron cages of hydrogen-bonded frameworks of the $H_2O$ molecules built around the $H_2$ molecules, wherein the unit cell is a sII unit cell.

25. The low-pressure hydrogen hydrate according to claim 24, wherein the sII unit cell includes 136 $H_2O$ molecules that form frameworks around eight hexakaidodecahedron and sixteen pentagonal dodecahedron cages, wherein some of the cages are more than doubly occupied with $H_2$ molecules.

26. A low-pressure hydrogen hydrate, comprising:

$H_2O$ molecules;

$H_2$ molecules; and a unit cell including polyhedron cages of hydrogen-bonded frameworks of the $H_2O$ molecules built around the $H_2$ molecules, wherein approximately 50 g/L of $H_2$ molecules are stored for later recovery.

* * * * *